US006569525B2

(12) United States Patent
Rieder et al.

(10) Patent No.: US 6,569,525 B2
(45) Date of Patent: May 27, 2003

(54) HIGHLY DISPERSIBLE REINFORCING POLYMERIC FIBERS

(75) Inventors: Klaus-Alexander Rieder, Beverly, MA (US); Neal S. Berke, Chelmsford, MA (US); Michael B. Macklin, Westford, MA (US); Anandakumar Ranganathan, Waltham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 44 days.

(21) Appl. No.: 09/843,427

(22) Filed: Apr. 25, 2001

(65) Prior Publication Data

US 2002/0182406 A1 Dec. 5, 2002

(51) Int. Cl.[7] .................................................. D01F 6/00
(52) U.S. Cl. ..................... 428/397; 428/400; 428/364; 428/359
(58) Field of Search .................... 428/359, 364, 428/397, 400; 523/122

(56) References Cited

U.S. PATENT DOCUMENTS

| | | | |
|---|---|---|---|
| 3,591,395 A | 7/1971 | Zonsveld et al. ............. 106/99 |
| 3,630,816 A | * 12/1971 | Parker ......................... 161/72 |
| 3,953,953 A | 5/1976 | Marsden ..................... 428/603 |
| 3,986,885 A | 10/1976 | Lankard ....................... 106/99 |
| 4,023,706 A | 5/1977 | Dearlove et al. .............. 222/1 |
| 4,060,999 A | 12/1977 | Marks et al. .................. 66/125 |
| 4,164,530 A | 8/1979 | Renjilian et al. ........... 264/103 |
| 4,199,366 A | 4/1980 | Schaefer et al. ............. 106/90 |
| 4,240,480 A | 12/1980 | Strobel .......................... 150/3 |
| 4,254,072 A | 3/1981 | Capaccio et al. ........ 264/210.3 |
| 4,261,754 A | 4/1981 | Krenchel et al. ............. 106/90 |
| 4,297,409 A | 10/1981 | Hannaht ..................... 428/247 |
| 4,297,414 A | 10/1981 | Matsumoto ................. 428/400 |
| 4,379,870 A | 4/1983 | Matsumoto ................. 523/221 |
| 4,414,030 A | 11/1983 | Restrepo ...................... 106/90 |
| 4,451,534 A | 5/1984 | Akagi et al. ................. 428/372 |
| 4,522,884 A | 6/1985 | Brody .......................... 428/400 |
| 4,565,840 A | 1/1986 | Kobayashi et al. ............. 524/8 |
| 4,710,540 A | 12/1987 | McAlpin et al. ............. 525/101 |
| 4,764,426 A | 8/1988 | Nakamura et al. .......... 428/400 |
| 4,968,561 A | 11/1990 | Mizobe et al. .............. 428/397 |
| 5,174,820 A | 12/1992 | Sakuta et al. ................ 106/724 |
| 5,224,774 A | 7/1993 | Valle et al. ..................... 366/2 |
| 5,330,827 A | 7/1994 | Hansen ....................... 428/283 |
| 5,399,195 A | 3/1995 | Hansen et al. .............. 106/711 |

(List continued on next page.)

FOREIGN PATENT DOCUMENTS

| | | |
|---|---|---|
| GB | 1067514 | 5/1967 |
| JP | 186448 | 9/1985 |
| WO | WO 97/26395 | 7/1997 |
| WO | WO 98/27022 | 6/1998 |
| WO | WO 99/36640 | 7/1999 |
| WO | WO 99/46214 | 9/1999 |
| WO | WO 00/49211 | 8/2000 |
| WO | WO 00/60150 | 10/2000 |

OTHER PUBLICATIONS

"ThermoPlastic Resin Fibers", SimaGroup R&D Department (Published before Apr. 25, 2001).
"State–of–the–Art Report on Fiber Reinforced Concrete", ACI Journal/Nov. 1973.
"Cement–based composites with mixtures of different types of fibers", Composites/Sep. 1975.

(List continued on next page.)

*Primary Examiner*—N. Edwards
(74) *Attorney, Agent, or Firm*—Craig K. Leon; William L. Baker

(57) ABSTRACT

Synthetic polymer reinforcing fibers provide dispersability and strength in matrix materials such as concrete, masonry, shotcrete, and asphalt. The individual fiber bodies, substantially free of stress fractures and substantially non-fibrillatable, have generally quadrilateral cross-sectional profiles along their elongated lengths.

20 Claims, 16 Drawing Sheets

U.S. PATENT DOCUMENTS

| | | | | |
|---|---|---|---|---|
| 5,413,634 A | | 5/1995 | Shawl et al. | 106/696 |
| 5,456,752 A | | 10/1995 | Hogan | 106/802 |
| 5,628,822 A | | 5/1997 | Hogan | 106/802 |
| 5,753,368 A | | 5/1998 | Berke et al. | 428/375 |
| 5,807,458 A | | 9/1998 | Sanders et al. | 156/276 |
| 5,853,853 A | * | 12/1998 | Nishihara et al. | 428/167 |
| 5,897,928 A | | 4/1999 | Sanders et al. | 428/36.92 |
| 5,985,449 A | | 11/1999 | Dill | 428/399 |
| 5,993,537 A | | 11/1999 | Troltier et al. | 106/724 |
| 6,045,911 A | | 4/2000 | Legrand et al. | 428/399 |
| 6,054,086 A | * | 4/2000 | Kurihara et al. | 264/147 |
| 6,071,613 A | | 6/2000 | Rieder et al. | 428/378 |
| 6,110,588 A | | 8/2000 | Perez et al. | 428/359 |
| 6,162,845 A | * | 12/2000 | Freed | 523/122 |
| 6,197,423 B1 | * | 3/2001 | Rieder et al. | 428/397 |
| 6,265,056 B1 | * | 7/2001 | Rieder et al. | 428/294.1 |

OTHER PUBLICATIONS

"Fatigue Crack Fracture and Arrest in Fiber Reinforced Concrete Under Interfacial Bond Degradation", T. Matsumoto, Dept. of Civil Engineering, University of Tokyo (Published before Apr. 25, 2001).

"Fiber Reinforced Concrete", ACI 544. 1R–96 (Published before Apr. 25, 2001).

"Grace Structural Fibers" "Product Information" Grace Construction Products Pamphlet, Jul. 2000.

"Flexural characteristics of steel fiber and polyethylene fiber—hybrid–reinforced concrete", Composite/Apr. 1982.

"Synthetic Fiber For Industry", Whiting Company, Feb. 17, 1990.

"Micro–Reinforced Cementitious Materials", Mat. Res. Soc. Symp. Proc. vol. 211/1991 Materials Research Society.

"Grace Structural Fibers" "Engineering Bulletin 1" Grace Construction Products Pamphlet, Jul. 2000.

U.S. patent application Ser. No. 09/416,012, Rieder et al., filed Oct. 8, 1999.

* cited by examiner

HIGHLY DISPERSIBLE REINFORCING POLYMERIC FIBERS

FIELD OF THE INVENTION

The invention relates to fibers for reinforcing matrix materials, and more particularly to a plurality of synthetic polymer fibers having excellent dispersibility and reinforcibility properties in hydratable cementitious compositions. Individual fiber bodies are elongated and highly bendable, with generally quadrilateral cross-sectional profiles, thereby minimizing fiber balling and maximizing fiber bond.

BACKGROUND OF THE INVENTION

Although fibers of the present invention are suitable for reinforcing various matrix materials, such as adhesives, asphalts, composites, plastics, rubbers, etc., and structures made from these, the fibers that will be described herein are especially suited for reinforcing hydratable cementitious compositions, such as ready-mix concrete, precast concrete, masonry concrete (mortar), shotcrete, bituminous concrete, gypsum compositions, gypsum- and/or Portland cement-based fireproofing compositions, and others.

A major purpose of the fibers of the present invention is to reinforce concrete, e.g., ready-mix, shotcrete, etc., and structures made from these. Such matrix materials pose numerous challenges for those who design reinforcing fibers.

Concrete is made using a hydratable cement binder, a fine aggregate (e.g., sand), and a coarse aggregate (e.g., small stones, gravel). A mortar is made using cement binder and fine aggregate. Concretes and mortars are hence brittle materials. If a mortar or concrete structure is subjected to stresses that exceed its maximum tensile strength, then cracks can be initiated and propagated therein. The ability of the cementitious structure to resist crack initiation and crack propagation can be understood with reference to the "strength" and "fracture toughness" of the material.

"Strength" relates to the ability of a cement or concrete structure to resist crack initiation. In other words, strength is proportional to the maximum load sustainable by the structure without cracking and is a measure of the minimum load or stress (e.g., the "critical stress intensity factor") required to initiate cracking in that structure.

On the other hand, "fracture toughness" relates to the specific "fracture energy" of a cement or concrete structure. This concept refers to the ability of the structure to resist propagation—or widening—of an existing crack in the structure. This toughness property is proportional to the energy required to propagate or widen the crack (or cracks). This property can be determined by simultaneously measuring the load required to deform or "deflect" a fiber-reinforced concrete (FRC) beam specimen at an opened crack and the amount or extent of deflection. The fracture toughness is therefore determined by dividing the area under a load deflection curve (generated from plotting the load against deflection of the FRC specimen) by its cross-sectional area.

In the cement and concrete arts, fibers have been designed to increase the strength and fracture toughness in reinforcing materials. Numerous fiber materials have been used for these purposes, such as steel, synthetic polymers (e.g., polyolefins), carbon, nylon, aramid, and glass. The use of steel fibers for reinforcing concrete structures remains popular due to the inherent strength of the metal. However, one of the concerns in steel fiber product design is to increase fiber "pull out" resistance because this increases the ability of the fiber to defeat crack propagation. In this connection, U.S. Pat. No. 3,953,953 of Marsden disclosed fibers having "J"-shaped ends for resisting pull-out from concrete. However, stiff fibers having physical deformities may cause entanglement problems that render the fibers difficult to handle and to disperse uniformly within a wet concrete mix. More recent designs, involving the use of "crimped" or "wave-like" polymer fibers, may have similar complications, depending on the stiffness of the fiber material employed.

Polyolefin materials, such as polypropylene and polyethylene, have been used for reinforcing concrete and offer an economic advantage due to relative lower cost of the material. However, these polyolefinic materials, being hydrophobic in nature, resist the aqueous environment of wet concrete. Moreover, the higher amount of polyolefin fibers needed in concrete to approximate the strength and fracture toughness of steel fiber-reinforced concrete often leads to fiber clumping or "balling" and increased mixing time at the job site. This tendency to form fiber balls means that the desired fiber dosage is not achieved. The correct concentration of fibers is often not attained because the fiber balls are removed (when seen at the concrete surface) by workers intent on achieving a finished concrete surface. It is sometimes the case that locations within the cementitious structure are devoid of the reinforcing fibers entirely. The desired homogeneous fiber dispersion, consequently, is not obtained.

Methods for facilitating dispersion of fibers in concrete are known. For example, U.S. Pat. No. 4,961,790 of Smith et al. disclosed the use of a water-soluble bag for introducing a large number of fibers into a wet mix. U.S. Pat. No. 5,224,774 of Valle et al. disclosed the use of non-water-soluble packaging that mechanically disintegrated upon mixing to avoid clumping and to achieve uniform dispersal of fibers within the concrete mix.

The dispersal of reinforcing fibers could also be achieved through packaging of smaller discrete amounts of fibers. For example, U.S. Pat. No. 5,807,458 of Sanders disclosed fibers that were bundled using a circumferential perimeter wrap. According to this patent, the continuity of the peripheral wrapping could be disrupted by agitation within the wet concrete mix, and the fibers could be released and dispersed in the mix.

On the other hand, World Patent Application No. WO 00/49211 of Leon (published Aug. 24, 2000) disclosed fibers "packeted" together but separable when mixed in concrete. A plurality of fibers were separably-bound together, such as by tape adhered to cut ends of the fibers, thereby forming a "packet." Within a wet cementitious mix, the packets could be made to break and/or dissolve apart to permit separation and dispersal of individual fibers within the mix.

The dispersal of reinforcing fibers may also be achieved by altering fibers during mixing. For example, U.S. Pat. No. 5,993,537 of Trottier et al. disclosed fibers that progressively fibrillated upon agitation of the wet concrete mix. The fibers presented a "low initial surface area" to facilitate introducing fibers into the wet mix, and, upon agitation and under the grinding effect of aggregates in the mix, underwent "fibrillation," which is the separation of the initial low-surface-area fibrous material into smaller, individual fibrils. It was believed that homogeneous fiber distribution, at higher addition rates, could thereby be attained.

A novel approach was taught in U.S. Pat. No. 6,197,423 of Rieder et al., which disclosed mechanically-flattened fibers. For improved keying within concrete, fibers were flattened between opposed rollers to attain variable width and/or thickness dimensions and stress-fractures perceivable through microscope as discontinuities and irregular and random displacements of polymer on the surface of the individual fibers. This microscopic stress fracturing was believed to improve bonding between cement and fibers, and, because the stress-fractures were noncontinuous in nature, the fibers were softened to the point at which fiber-to-fiber entanglement (and hence fiber balling) was minimized or avoided. The mechanical-flattening method of Rieder et al. was different from the method disclosed in U.S. Pat. No. 5,298,071 of Vondran, wherein fibers were interground with cement clinker and retained cement particles embedded into the surface.

In this vein, the nature of the fiber surface has also been a frequent topic of research in fiber dispersion and bonding in concrete. For example, U.S. Pat. No. 5,753,368 of Hansen disclosed a list of wetting agents such as emulsifiers, detergents, and surfactants to render fiber surfaces more hydrophilic and thus more susceptible to mixing in wet concrete. On the other hand, U.S. Pat. No. 5,753,368 of Berke et al. taught that the bonding between concrete and fibers could be enhanced by employing particular glycol ether coatings instead of conventional wetting agents that tended to introduce unwanted air at the fiber/concrete interface.

Of course, as mentioned in U.S. Pat. No. 5,298,071 and U.S. Pat. No. 6,197,423 as discussed above, physical deformation of the fiber surface was also believed to improve the fiber-concrete bond. U.S. Pat. No. 4,297,414 of Matsumoto, as another example, taught the use of protrusions and ridges to enhance bond strength. Other surface treatments, such as the use of embossing wheels to impose patterns on the fiber, were also used for improving fiber-concrete bond. Fiber designers have even bent fibers into sinusoidal wave shapes to increase the ability of fibers to resist being pulled out from concrete. However, the present inventors realized that increased structural deformations in the fiber structure may actually enhance opportunities for unwanted fiber balling to occur.

Against this background, the present inventors see a need for novel polymeric synthetic reinforcing fibers having ease of dispersibility in concrete so as to avoid fiber balling and to achieve intended fiber dosage rates, while at the same time to provide strength and fracture toughness in matrix materials and particularly brittle materials such as concrete, mortar, shotcrete, gypsum fireproofing, and the like.

SUMMARY OF THE INVENTION

In surmounting the disadvantages of the prior art, the present invention provides highly dispersible reinforcing polymer fibers, matrix materials reinforced by the fibers, and methods for obtaining these. Exemplary fibers of the invention provide ease of dispersibility into, as well as strength and fracture toughness when dispersed within, matrix materials, particularly brittle ones such as concrete, mortar, gypsum or Portland cement-based fireproofing, shotcrete, and the like.

These qualities are achieved by employing a plurality of individual fiber bodies having an elongated length defined between two opposing ends, the bodies having a generally quadrilateral cross-sectional shape along the elongated length of the fiber body. The individual fibers thereby have a width, thickness, and length dimensions wherein average width is 1.0–5.0 mm and more preferably 1.3–2.5 mm, average thickness is 0.1–0.3 mm and more preferably 0.15–0.25 mm., and average length is 20–100 mm and more preferable 30–60 mm. In preferred embodiments, average fiber width should exceed average fiber thickness by at least 4 times (i.e., a ratio of at least 4:1) but preferably average width should not exceed average thickness by a factor exceeding 50 times (50:1). More preferably, the width to thickness ratio of the fibers is from 5 to 20 (5:1 to 20:1).

While individual fiber bodies of the invention may optionally be introduced into and dispersed within the matrix material as a plurality of separate pieces or separable pieces (ie. fibers in a scored or fibrillatable sheet, or contained within a dissolvable or disintegratable packaging, wrapping, packeting, or coating) the fibers can be introduced directly into a hydratable cementitious composition and mixed with relative ease to achieve a homogeneous dispersal therein. Individual fiber bodies themselves, however, should not be substantially fibrillatable (i.e. further reducible into smaller fiber units) after being subjected to mechanical agitation in the matrix composition to the extent necessary to achieve substantially uniform dispersal of the fibers therein.

Exemplary individual fiber bodies of the invention are also substantially free of internal and external stress fractures, such as might be created by clinker grinding or mechanical flattening. The general intent of the present inventors is to maintain integrity of the individual fiber bodies, not only in terms of structural fiber integrity, but also integrity and uniformity of total surface area and bendability characteristic from one batch to the next.

A generally quadrilateral cross-sectional profile provides a higher surface area to volume ratio ($S_a/V$) compared to round or oval monofilaments comprising similar material and having a diameter of comparable dimension. The present inventors believe that a quadrilateral cross-sectional shape provides a better flexibility-to-volume ratio in comparison with round or elliptical cross-sectional shapes, and, more significantly, this improved flexibility characteristic translates into better "bendability" control. The individual fiber bodies of the invention will tend to bend predominantly in a bow shape with comparatively less minimal twisting and fiber-to-fiber entanglement, thereby facilitating dispersal. In contrast, for a given material modulus and cross-sectional area, the prior art fibers having circular or elliptical cross section with major axis/minor axis ratios of less than 3 will have greater resistance to bending, thereby having a greater tendency for fiber balling when compared to fibers of generally quadrilateral (e.g., rectangular) cross-section.

The present inventors further believe that a generally quadrilateral cross-section will provide excellent fiber surface area and handability characteristics when compared, for example, to round or elliptical fibers. In this connection, preferred fibers of the invention have a "bendability" in the range of 20 (very stiff) to 1300 (very bendable) milli Newton$^{-1}$*meter$^{-2}$ (mN$^{1-}$m$^{-2}$), and more preferably in the range of 25 to 500 milli Newton$^{-1}$*meter$^{-2}$. As used herein, the term "bendability" means and refers to the resistance of an individual fiber body to flexing movement (ie. to force that is perpendicular to the longitudinal axis of the fiber) as measured by applying a load to one end of the fiber and measuring its relative movement with respect to the opposite fiber end that has been secured, such as within a mechanical clamp or vice, to prevent movement. Thus, a fiber can be called more bendable if it requires less force to bend it to a certain degree. The bending flexibility of a fiber is a function of its length, shape, the size of its cross-section, and its modulus of elasticity. Accordingly, the bendability "B" of the fiber is expressed in terms of milli Newton$^{-1}$*meter$^{-2}$ (mN$^{-1}$m$^{-2}$) and is calculated using the following formula $$B = \frac{1}{3 \cdot E \cdot I}$$

wherein "E" represents the Young's modulus of elasticity (Giga Pascal) of the fiber; and "I" represents the moment of inertia (mm$^4$) of the individual fiber body. A fiber having a lower bendability "B" will of course be less flexible than a fiber having a higher bendability "B." The moment of inertia "I" describes the property of matter to resist any change in movement or rotation. For a cross-sectional profile having a generally quadrilateral (or approximately rectangular) shape, the moment of inertia can be calculated using the formula $$I_{rectangle} = \frac{1}{12} \cdot w \cdot t^3$$

wherein "w" represents the average width of the rectangle and "t" represents the average thickness of the rectangle.

In further exemplary embodiments, the "bendability" of fibers can be further improved if the thickness and/or the width of the fibers are varied along the length of the fibers, for example from 2.5–25 percent maximum deviation from the average thickness or width value. This small variation of the thickness and/or the width of the fiber also improves the bond between the reinforcing matrix and the fiber.

The inventors realized, in view of the above equation for "bendability" "B" of fibers having generally quadrilateral cross-sections, that an increase in the fiber modulus of elasticity "E" will result in a corresponding decrease in bendability and, consequently, make fiber dispersibility more difficult. The inventors then realized that to maintain the same level of bendability, the moment of inertia "I" must be decreased, and this could be achieved, for example, by reducing the thickness of the fibers while maintaining the cross-sectional area of the fibers.

In further embodiments of the invention, preferred individual fiber bodies have the following properties when measured in the longitudinal dimension (end to end) along the axis of the fiber body: a Young's modulus of elasticity of 3–20 Giga Pascals and more preferable 5–15 Giga Pascals, a tensile strength of 350–1200 Mega Pascals and more preferable 400–900 Mega Pascals, and a minimum load carrying capacity in tension mode of 40–900 Newtons more preferable 100–300 Newtons.

A particularly preferred method for manufacturing the fibers is to melt-extrude the polymeric material (e.g., polypropylene as a continuous sheet); to decrease the temperature of this extruded sheet melt below ambient temperature (e.g., below 25° C.); to cut or slit the sheet (after cooling) into separate or separable individual fiber bodies having generally quadrilateral cross-sections to stretch the individual fibers by at least a factor of 10–20 and more preferably between 12–16, thereby to achieve an average width of 1.0–5.0 mm and more preferably 1.3–2.5 mm and an average thickness of 0.1–0.3 mm and more preferably 0.15–0.25 mm; and to cut the fibers to obtain individual fiber bodies having an average fiber length of 20–100 mm and more preferably between 30–60 mm. Further exemplary processes are described hereinafter.

The present invention is also directed to matrix materials, such as concrete, mortar, shotcrete, asphalt, and other materials containing the above-described fibers, as well as to methods for modifying matrix materials by incorporating the fibers into the matrix materials.

Further advantages and features of the invention are further described in detail hereinafter.

BRIEF DESCRIPTION OF DRAWING

An appreciation of the advantages and benefits of the invention may be more readily comprehended by considering the following written description of preferred embodiments in conjunction with the accompanying drawings, wherein.

DESCRIPTION OF PREFERRED EMBODIMENTS OF THE INVENTION

Figure 1:
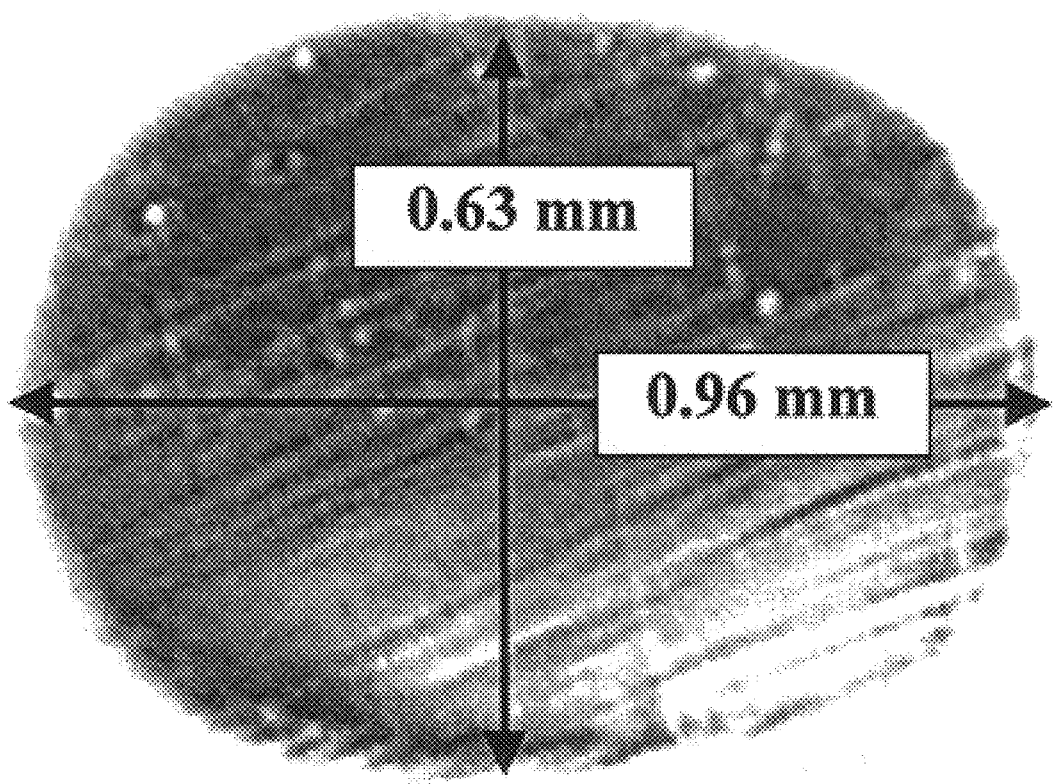
FIGS. 1–3 are microphotographic enlargements of the cross-sections of PRIOR ART reinforcing fibers.

The present inventors believe that the reinforcing polymer fibers of the present invention may be used in a variety of compositions and materials and structures made from these. The term "matrix materials" therefore is intended to include a broad range of materials that can be reinforced by the fibers. These include adhesives, asphalt, composite materials (e.g., resins), plastics, elastomers such as rubber, etc., and structures made therefrom.

Preferred matrix materials of the invention include hydratable cementitious compositions such as ready-mix concrete, precast concrete, masonry mortar and concrete, shotcrete, bituminous concrete, gypsum-based compositions (such as compositions for wallboard), gypsum- and/or Portland cement-based fireproofing compositions (for boards and spray-application), water-proofing membranes and coatings, and other hydratable cementitious compositions, whether in dry or wet mix form.

A primary emphasis is placed upon the reinforcement of structural concrete (e.g., ready-mix concrete, shotcrete), however, because concrete (whether poured, cast, or sprayed) is an extremely brittle material that presents challenges in terms of providing reinforcing fibers that (1) can be successfully introduced into and mixed in this matrix material and (2) can provide crack-bridging bonding strength in the resultant fiber reinforced concrete structure.

Prior to a detailed discussion of the various aforementioned drawings and further exemplary embodiments of the invention, a brief discussion of definitions will be helpful to facilitate a deeper understanding of advantages and benefits of the invention. As the fibers of the invention are envisioned for use in the paste portion of a hydratable wet "cement" or "concrete" (terms which may sometimes be used interchangeably herein), it is helpful to discuss preliminarily the definitions of "cement" and "concrete."

The terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace slag, pozzolans, and silica fume or other materials commonly included in such cements) and water; mortars are pastes additionally including fine aggregate (e.g., sand); and concretes are mortars additionally including coarse aggregate (e.g., gravel, stones). "Cementitious" compositions of the invention thus refer and include all of the foregoing. For example, a cementitious composition may be formed by mixing required amounts of certain materials, e.g., hydratable cementitious binder, water, and fine and/or coarse aggregate, as may be desired, with fibers as described herein.

Synthetic polymer fibers of the invention comprise at least one polymer selected from the group consisting of polyethylene (including high density polyethylene, low density polyethylene, and ultra high molecular weight polyethylene), polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), poly(butylene terephthalate), polyamide, polybutene, and thermotropic liquid crystal polymers. A preferred synthetic polymer is polypropylene. Exemplary individual fiber bodies of the invention may comprise 100% polypropylene, or, as another example, they may comprise predominantly polypropylene (e.g., at least 70–99%) with the remainder comprising another polymer (such as high density polyethylene, low density polyethylene) or optional fillers, processing aids, and/or wetting agents, such as are conventionally used in the manufacture of polymer fibers.

The molecular weight of the polymer or polymers should be chosen so that the polymer is melt processable. For polypropylene and polyethylene, for example, the average molecular weight can be 5,000 to 499,000 and is more preferably between 100,000 to 300,000. Different grades of polyethylene may be used, including ones containing branches and comonomers such as butene, hexene, and octene, and further including the so-called "metallocene" polyethylene materials. If polypropylene polymer is used, it is preferred that no more than about 30 weight percent polymerized comonomer units or blended resins be present in order to maintain smooth process operation, with up to about 10% being preferred. Propylene homopolymer resins are most preferred, with general-purpose resins in the nominal melt flow range of about 1 to about 40 grams/10 minutes (ASTM D2497 1995). Preferred resins also have weight average molecular weight to number average molecular ratios of about 2:1 to about 7:1.

FIG. 1 is a cross-sectional view, originally taken at about 100×magnification, of a PRIOR ART polypropylene fiber with an elliptical cross-section having dimensions of 0.96 mm in width and 0.63 mm in thickness. The width is close to thickness, and the fiber can twist almost equally well in all directions about its longitudinal axis.

Figure 2:
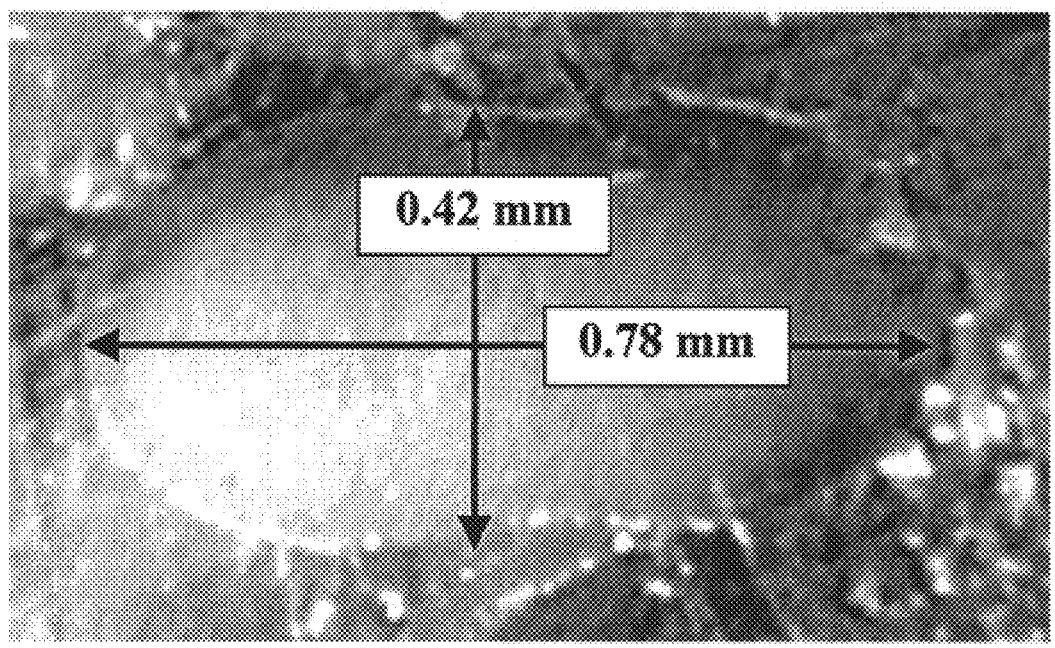

FIG. 2 is a cross-sectional view, originally taken at about 100×magnification, of a PRIOR ART elliptical (or oval)-shaped fiber made from polyvinylacetate having 0.78 mm width and 0.42 mm thickness.

Figure 3:
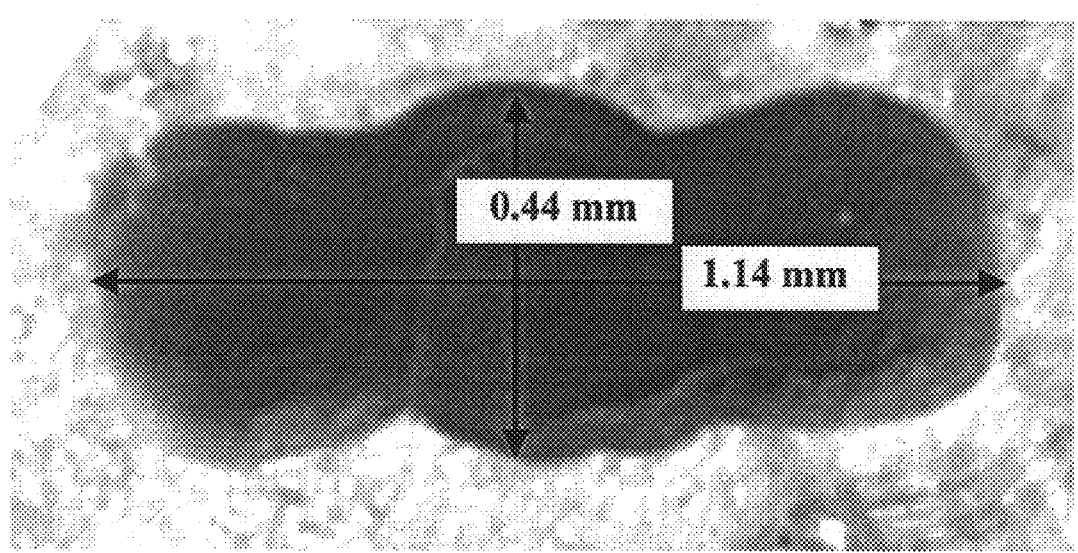

FIG. 3 is a cross-sectional view, originally taken at about 100×magnification, of a PRIOR ART fibrillatable fiber commercially available under the tradename GRACE® Structural Fibers. This fiber is designed to fibrillate or break into smaller fibrils when mixed in concrete. The cross-sectional profile resembles a tri-lobed peanut.

Figure 4:
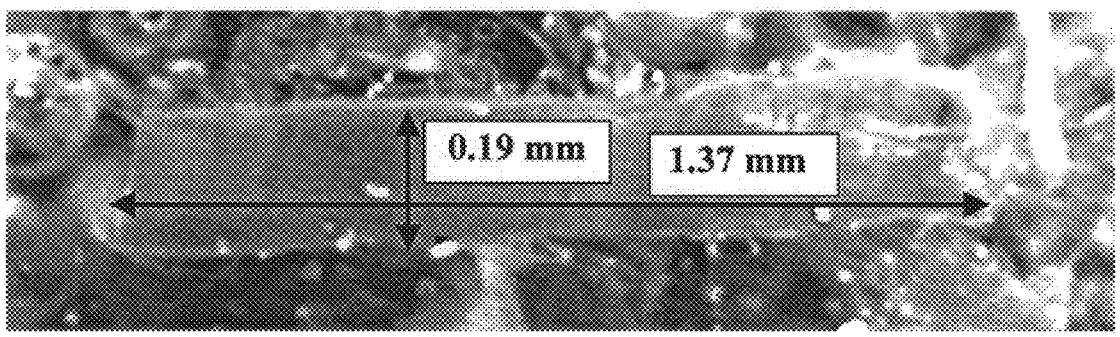
FIGS. 4 and 5 are microphotographic enlargements of the generally quadrilateral cross-sectional profile of exemplary fibers of the present invention.

FIG. 4 is a cross-sectional view, originally taken at about 100×magnification, of an exemplary individual fiber body of the present invention. The generally quadrilateral cross-sectional profile is evident, in that four sides can be discerned, although the small right side is not completely straight. The quadrilateral shape could more accurately be characterized as trapezoidal in nature, because the longer pair of sides (which define the width) are generally parallel to each other, while the two smaller sides are somewhat angled with respect to the longer sides and to each other. The inventors believe that when such individual fiber bodies are slit from a larger sheet using cutting blades, the angle or attitude of the blades can define whether the smaller sides will have an angle such as in a trapezoid (wherein the two smaller sides will have different angles), parallelogram (wherein the two smaller sides, in addition to the two longer sides, will be parallel to each other), or rectangle (opposing sides are equal, and the angles are all about 90 degrees).

The term "quadrilateral" or "generally quadrilateral" as used herein shall mean and refer to a cross-sectional profile that has four sides, at least two of which are generally parallel to each other and define the width dimension of the fiber. The two shorter sides or faces (which therefore define the thickness aspect of the fiber) may or may not be parallel to each other. The two shorter sides or faces may not even be straight but could assume, for example, a concave or convex shape if the fibers were extruded as separate bodies rather than being cut from a sheet.

Figure 5:

FIG. 5 is a partial cross-sectional view, originally taken at about 200×magnification, of an exemplary individual fiber body of the present invention, having 0.19 mm measured thickness. In this enlarged microphotograph, the small side is generally perpendicular to the two longer sides (which are 0.19 mm apart), but there is a slight imperfection at the corners. While sharper corners are preferred, because they are believed by the present inventors to decrease fiber-to-fiber entanglement, some rounding or imperfections due to the manufacturing process are to be expected.

Figure 6:
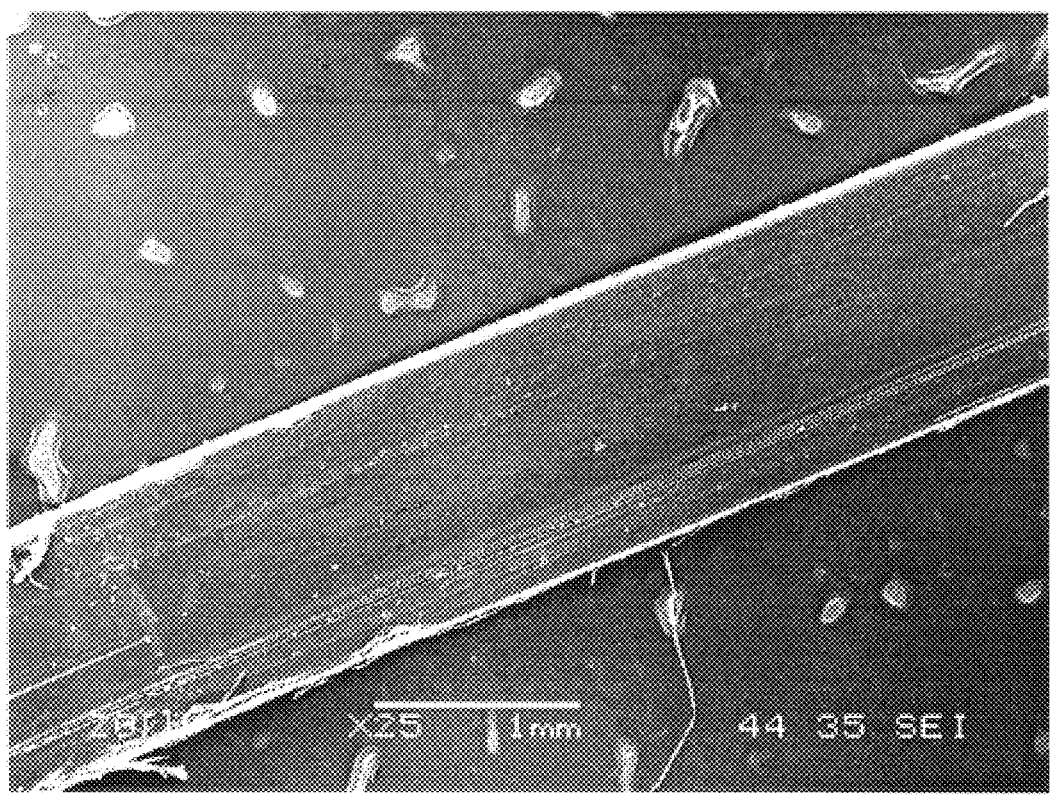
FIG. 6 is microphotographic enlargement (at 25×magnification) of the surface of an exemplary individual fiber body of the present invention before mixing in a concrete mixture (which would contain fine and coarse aggregates)

FIG. 6 is a view, originally at about 25×magnification, of the outer surface of an exemplary individual fiber body of the present invention. Exemplary fibers are substantially non-fibrillatable when mixed and substantially uniformly dispersed in concrete. Accordingly, there are substantially no stress-fractures or discontinuities to be seen in the relatively smooth polymer surface of the fiber, although some surface streaking and imperfections due to the extrusion process and/or slitting process will be seen under magnification. The present inventors believe that introducing into concrete individual fiber bodies that are not mechanically flattened (to the point of having micro-stress-fractures over the entire surface) and that are not fibrillatable (reducible into still smaller fibrils when subjected to mechanical agitation in concrete) will lead to more uniform dispersing and reinforcing characteristics, due to uniform fiber surface area to fiber volume ratios and structural integrity from fiber to fiber. Moreover, the surface of the fibers of the invention, upon being subjected to mechanical agitation within the aggregate-containing concrete, will attain a desirable surface roughness that will facilitate bonding of fibers within the concrete matrix when the concrete is solidified.

Figure 7:
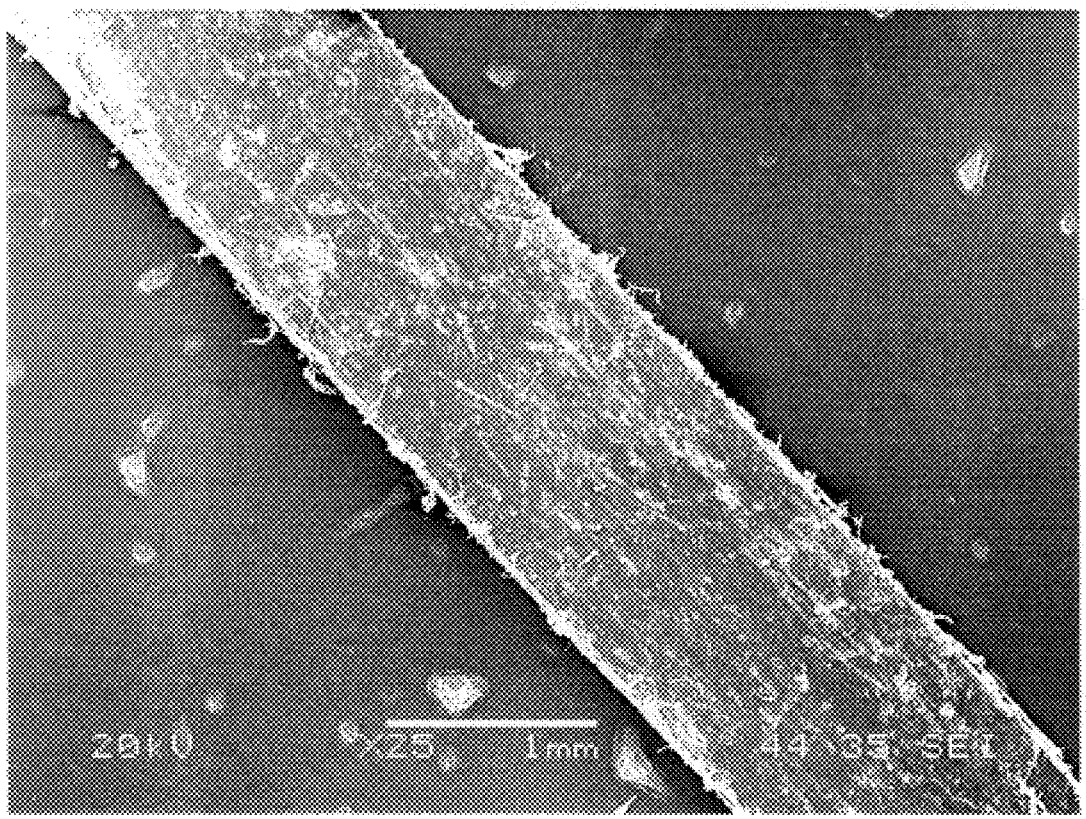
FIG. 7 shows the fiber after mixing.
Figure 8:
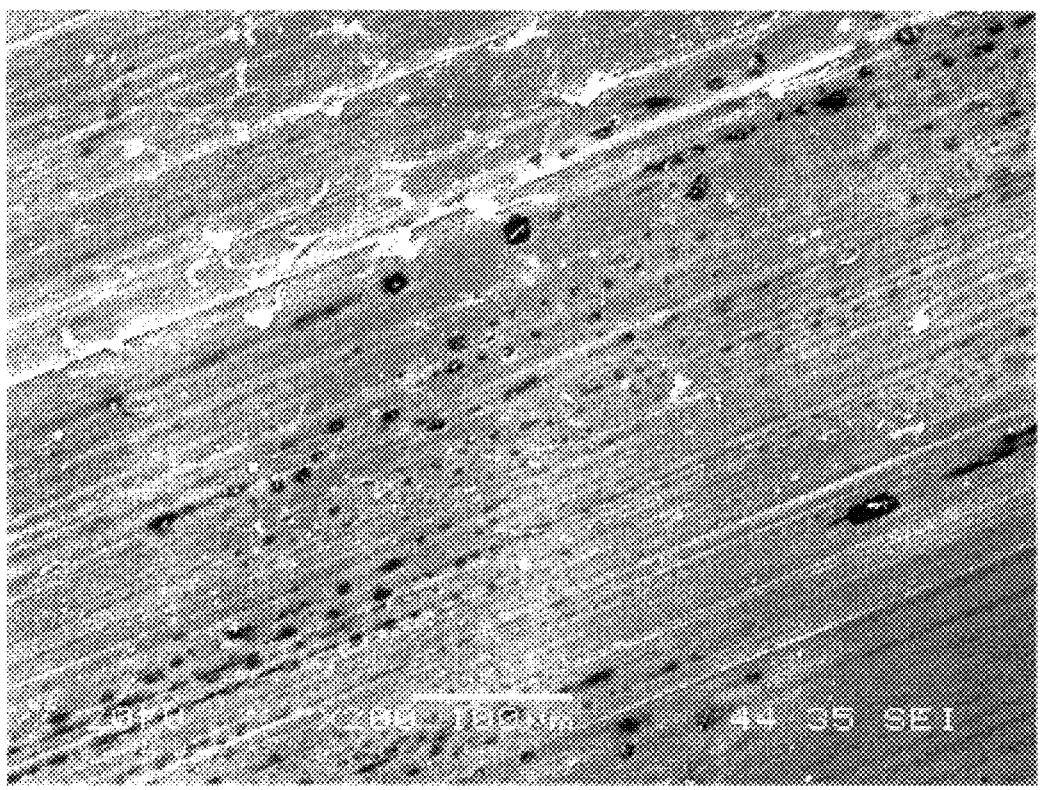
FIG. 8 is microphotographic enlargement (at 200× magnification) of the surface of an exemplary individual fiber body of the present invention before mixing in a concrete mixture (which would contain fine and coarse aggregates)
Figure 9:
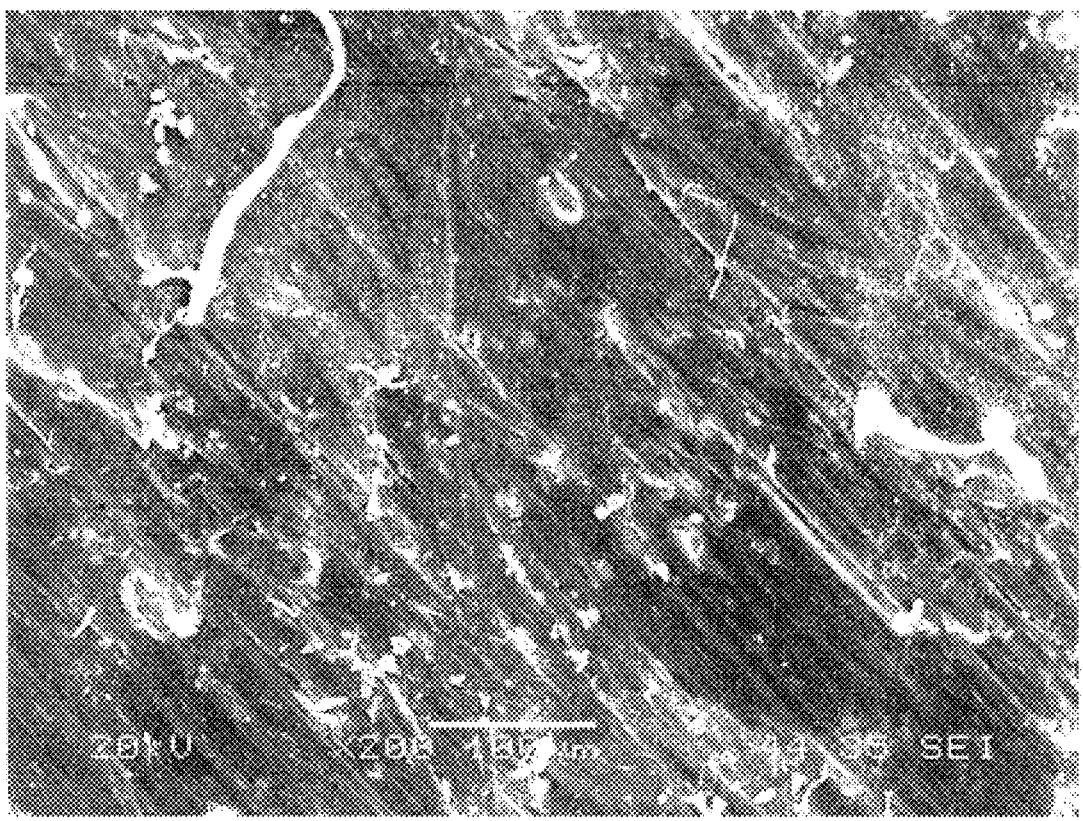
FIG. 9 shows the fiber after mixing.

FIG. 7 is a view at 25×magnification of the fiber of FIG. 6 after it has been mixed in concrete for five minutes at twenty-five rpm in a twin shaft mixer (and removed for purposes of illustration herein). Although the fiber surface remains substantially free of micro-stress fractures (e.g., cracks), it will experience a roughening or increased opacity due to the effect of the aggregate in the concrete mix. At 200×magnification, as shown in FIG. 8, the surface of the fiber, before being introduced into concrete, is substantially free of deformities, the only features being perceived at this level of magnification are slight streaking and imperfections due to the extrusion method used for making the sheet from which the individual fibers are cut. After being substantially uniformly dispersed in a concrete mix, the fiber, as shown at the same 200×magnification in FIG. 9, does not demonstrate substantial stress-fracturing or fibrillation. However, a desirable surface roughening is discernible when viewed at this magnification level. Also, because the polymeric material of the fibers of the present invention will be highly oriented, it is not unusual that at higher magnifications there will be evident some small strands sticking out from the fiber body, but this can be attributed to having molecular pieces separate from each other, or otherwise to imperfections or scraping and does not constitute substantial fibrillation wherein the fiber body splits into smaller fibril units.

Figure 10:
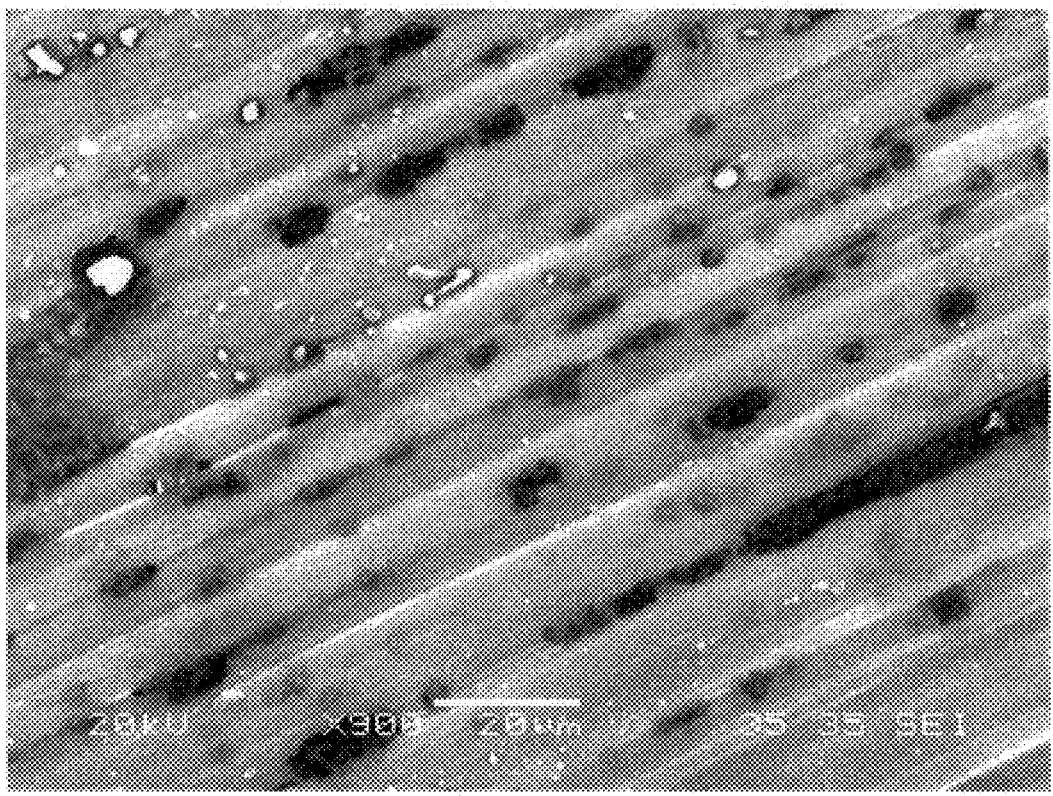
FIG. 10 is microphotographic enlargement (at 900× magnification) of the surface of an exemplary individual fiber body of the present invention before mixing in a concrete mixture (which would contain fine and coarse aggregates)
Figure 11:
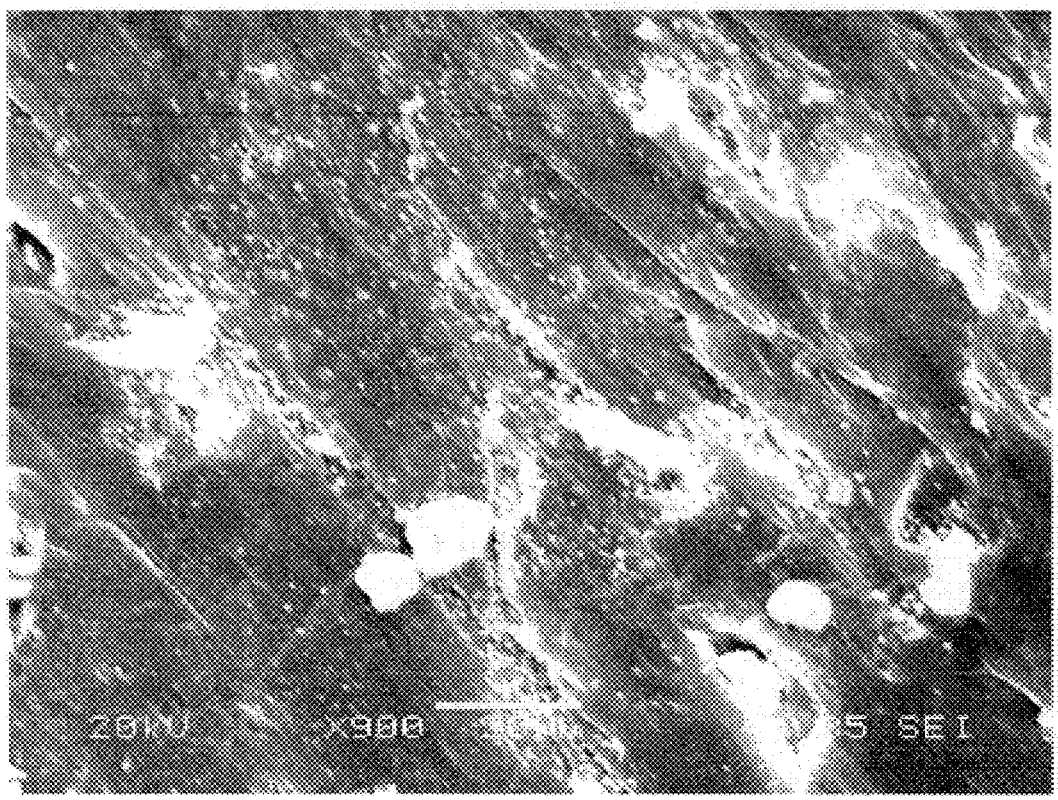
FIG. 11 shows the fiber after mixing.
Figure 12:
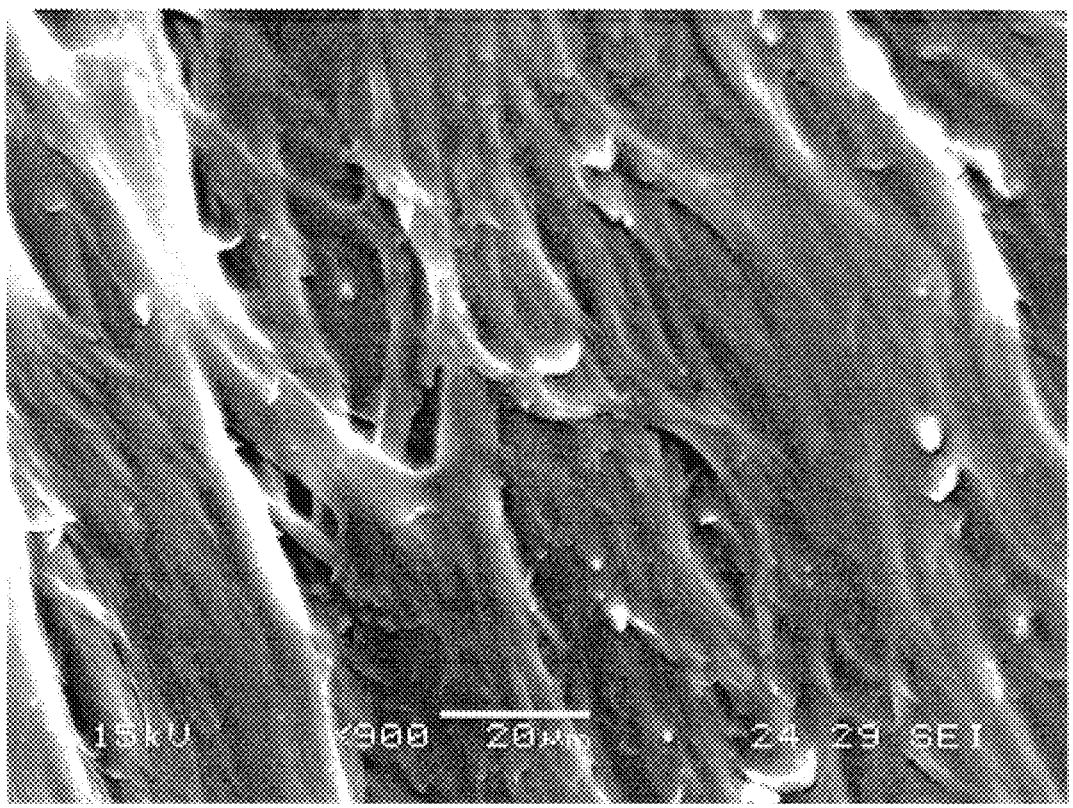
FIG. 12 is a microphotographic enlargement (at 900× magnification) of a PRIOR ART fiber mechanically flattened in accordance with U.S. Pat. No. 6,197,423.

The polymer fiber surfaces of FIGS. 10–12 were all photographed at about 900×magnification and evidence major differences between exemplary fibers of the present invention (FIGS. 10, 11) and a mechanically-flattened PRIOR ART fiber (as shown in FIG. 12). FIGS. 10 and 11 show the fiber surface, respectively, before and after being mixed in wet concrete using a twin shaft mixer (having counter-rotating blades) to attain substantially uniform dispersion of fibers in the concrete. The extrusion streaking, which is seen in FIG. 10, is desirably roughened as shown in FIG. 11, but without substantial stress-fracturing or subsurface discontinuities. Even after being mixed in the concrete (which contains sand and coarse aggregate such as crushed stone or gravel), the surface of the fiber of the present invention (FIG. 11) does not develop a micro-stress fractured morphology (e.g., sinewed discontinuities) as seen in the mechanically-flattened PRIOR ART fiber (FIG. 12), but nevertheless is able to provide a desirably roughened surface and overall integrity as well as to provide desirable bendability characteristics for achieving dispersion of a plurality of individual fiber bodies within the concrete matrix.

As used herein and above, the terms "plurality" of "individual fiber bodies" refer to situations wherein a number of fibers that are identical in terms of material content, physical dimensions, and physical properties are introduced into the matrix material. Exemplary fiber bodies of the invention are substantially free of surface stress fractures and substantially non-fibrillatable when mechanically agitated within the matrix material to be reinforced, and they have a generally quadrilateral cross-sectional profile along said elongated length, wherein average width is 1.0–5.0 mm. and more preferably 1.3–2.5 mm, average thickness is 0.1–0.3 mm and more preferably 0.15–0.25 mm., and average length is 20–100 mm. In preferred embodiments, average fiber width should exceed average fiber thickness by at least 4:1 but by no more than 50:1, and more preferably the width to thickness ratio (for fibers having average length of 20–100 mm) is 5–20 (5:1 to 20:1).

In further exemplary embodiments of the invention, a first plurality of individual fibers can be mixed with a second plurality of individual fiber bodies (i.e. comprising different materials, different physical dimensions, and/or different physical properties in comparison with the first plurality of fibers) to modify the matrix composition. The use of additional pluralities of fibers, having different properties, is known in the art. Hybrid blends of fibers is disclosed, for example, in U.S. Pat. No. 6,071,613 of Rieder and Berke, and this use of hybrid blending may be used in association with the fibers of the present invention as well. For example, first plurality of fibers may comprise polymeric material having geometry, dimensions, minimum load carrying capacity, and bendability as taught by the present invention, whereas a second plurality of fibers may comprise another material such as steel, glass, carbon, or composite material. As another example, a first plurality of fibers may have a particular bendability characteristic and/or physical dimension (in terms of average width, thickness, or length), while a second plurality of fibers may comprise identical or similar polymer materials and employ a different bendability characteristic and/or physical dimension(s).

Exemplary pluralities of fibers as contemplated by the present invention may be provided in a form whereby they are packaged or connected together (such as by using a bag, peripheral wrap, a coating, adhesive, or such as by partial cutting or scoring of a polymer precursor sheet, etc.). However, as previously discussed above, "individual fiber bodies" of the invention are defined as being themselves separated from other fiber bodies or as being separable from other fibers when mixed into the concrete. Thus, exemplary fibers of the invention can be said to comprise a plurality of individual fiber bodies wherein the individual fiber bodies are separated from each other or wherein individual fiber bodies are connected or partially connected to each other but capable of becoming separated after being introduced into and mixed within the matrix composition (to the point of substantially uniform dispersion).

The present inventors believe that the bendability of individual polymer fibers can be controlled more precisely, in part, by using the generally quadrilateral cross-sectional profile. The present inventors sought to avoid too much flexibility whereby fibers became wrapped around other fibers (or around themselves) such that fiber balling arises. They also sought to avoid extreme rigidity, which is often associated with strength, because this too can lead to undesirable fiber "balling." Flexibility that is too high (such as in wet human hair) can be just as troublesome as stiffness (such as in the "pick-up-sticks" game played by children) because self-entanglement can arise in either case. A high degree of fiber balling or entanglement means that substantially uniform dispersion has not been attained in the matrix material; and this, in turn, means that the fiber dosage will be inadequate and the material properties of the fiber reinforced material will be subject to significant variation.

The present inventors believe that for best dispersion properties, bendability needs to be sufficiently high to minimize stress transfer among the other fibers. In order to achieve this, the inventors believed that alterations in the shape and size of the fiber and elastic modulus of fibers were worth consideration. For example, a lower elastic modulus will increase the bendability of the fiber, if the shape and size of its cross-section remain constant. On the other hand, inventors also believe it is necessary to consider the elastic modulus of the matrix material to be reinforced. For polypropylene fibers, the elastic modulus is in the range of 2–10 Giga Pascals; and for a matrix material such as concrete (when hardened) the elastic modulus is in the range of 20 to 30 Giga Pascals, depending on the mix design used. The present inventors believe that to improve the properties of the matrix material (hardened concrete) especially at small crack openings or deflections, the elastic modulus of the fiber should preferably be at least as high as the elastic modulus of the matrix material (hardened concrete). As mentioned above, an increase in elastic modulus usually means a decrease in bendability, which has a negative impact on dispersion properties of the plurality of fibers. Thus, in order to keep the bendability high, the present inventors have chosen to modify the both the shape and cross-sectional area of the individual fiber bodies. Fracture tests of concrete specimens containing the fibers have indicated that a minimum load-carrying capacity under tension (and not minimum tensile stress) of fibers is needed for transferring significant stresses across a cracked section of concrete. This also helps to keep the number of fibers per unit volume of concrete down, and this lowered dosage requirement has a positive effect in terms of improving workability of the fresh fiber reinforced concrete. It is a well-known fact that micro-fibers (having diameters of 20–60 micrometers) which are added to concrete for plastic shrinkage cracking control (rather than structural reinforcement, for example) can not be added in large volumes due to the high number of fibers per unit weight (e.g., high surface area). Typical dosage rates for these fibers range from 0.3 kg/m$^3$ to 1.8 kg/m$^3$ (0.033 vol. % to 0.2 vol. %). Fibers added at these low dosage rates do not have a significant effect on the hardened properties of concrete. Fibers that are supposed to have an effect on the hardened properties of concrete need to be added in larger volumes due to the significant higher stresses needed to be transferred across cracked concrete sections.

Ideally, the present inventors believe that fibers, used in a concrete structure that is cracked, provide a balance between anchoring in concrete and pull-out from concrete. In other words, about half of the fibers spanning across the crack should operate to pull out of the concrete while the other half of the fibers spanning the crack should break entirely, at the point at which the concrete structure becomes pulled completely apart at the crack. Thus, exemplary fibers of the present invention are designed with particular physical dimensions that combine dispersibility with toughness for the purpose at hand.

An exemplary process for manufacturing fibers of the invention comprises: melt extruding a synthetic polymeric material (e.g., polypropylene, polypropylene-polyethylene blend) through a dye to form a sheet; cooling the extruded polymer sheet (such as by using a chill take-up roll, passing the sheet through a cooling bath, and/or using a cooling fan); cutting the sheet to provide separate individual fibers (such as by pulling the sheet through metal blades or rotary knives), whereby a generally quadrilateral cross-sectional profile is obtained (preferably having the average width and thickness dimensions as described in greater detail above); stretching the polymer in the longitudinal direction of the fibers by a factor of at least 10 to 20 and more preferably by a factor of 12–16. After the stretching and cutting steps, the individual fibers can be cut to form individual bodies having average 20–100 mm lengths. Thus, exemplary individual fiber bodies of the invention will have elongated bodies, comprising one or more synthetic polymers, having an orientation (stretch ratio) in the direction of the length of the fiber bodies (a longitudinal orientation) of at least 10–20 and more preferably 12–16.

A further exemplary method for making the fibers with generally quadrilateral cross-sections comprises extruding the polymer or polymeric material through a four-cornered, star-shaped die orifice, stretching the extruded fibers by a factor of 10–20 (and more preferably by a factor of 12–16), and cutting the stretched fibers to 20–100 mm lengths. In still further exemplary embodiments, fibers having round or elliptical shapes may be extruded, and, while still at a high temperature, be introduced between rollers (which optionally be heated) to flatten the fibers into a generally quadrilateral shape (although in this case the smaller faces of the fibers may have a slightly arched or convex shape).

In addition to the fiber body embodiments mentioned above, still further exemplary fiber embodiments are possible. For example, individual fiber bodies may have a variability of thickness and/or width along individual fiber body length of at least 2.5 percent deviation (and more preferably at least 5.0 percent deviation) and preferably no more than 25 percent deviation from the average (thickness and/or width). For example, it may be possible during cutting of the polymer sheet that the blades can be moved back and forth so that the width of the fibers can be varied within the 20–100 mm length of the individual fiber bodies.

In further exemplary embodiments, individual fiber bodies may comprise at least two synthetic polymers, one of said at least two synthetic polymers comprising an alkaline soluble polymer disposed on the outward fiber surface thereby being operative to dissolve when said fiber bodies are mixed into the alkaline environment of a wet concrete mix. Alternatively, individual fiber bodies may be coated with an alkaline soluble polymer. When dissolved in the alkaline environment of a wet concrete mix, the outer surface of the fiber could be increased for improved keying with the concrete when hardened. An alkaline soluble (high pH) polymer material suitable for use in the present invention could comprise, for example, polymers of unsaturated carboxylic acids.

Exemplary fibers of the invention may also be packaged with one or more admixtures as may be known in the concrete art. Exemplary admixtures include superplastizicers, water reducers, air entrainers, air detrainers, corrosion inhibitors, set accelerators, set retarders, shrinkage reducing admixtures, fly ash, silica fume, pigments, or a mixture thereof. The one or more admixtures may be selected, for example, from U.S. Pat. No. 5,203,692 of Valle et al., incorporated by reference herein. The fibers may also be coated with wetting agents or other coating materials as may be known to those of ordinary skill in the concrete industry.

Further features and advantages of the exemplary fibers, matrix compositions, and processes of the invention may be illustrated by reference to the following examples.

EXAMPLE 1

Prior Art

Prior art fibers having an elliptical shaped cross section were tested in terms of bendability and dispersibility in a concrete mix. These elliptical fibers were 50 mm long, 1.14 mm wide, 0.44 mm. thick, and had a Young's modulus of elasticity of 4 Giga Pascal. The "bendability" formula discussed above may be employed, wherein bendability "B" was computed as $B=1/(3 \cdot E \cdot I)$, and the moment of inertia (I) for ellipses is calculated by the formula, $I_{ellipse}=Pi/64 \cdot a \cdot b^3$, where "a" is half the width of the elliptical fiber (major axis of the ellipse, i.e., widest dimension through the center) and "b" is half the thickness of the elliptical fiber (minor axis of the ellipse, i.e. thinnest dimension through the center point of the ellipse). The bending deflection "B" was computed to be 17.5 mN$^{-1}$*m$^{-2}$. This fiber is considered a "stiff" fiber. 30 minutes were required for introducing 100 pounds of these elliptical fibers into 8 cubic yards of concrete. The concrete resided in the drum of a ready-mix truck and was rotated at 15 revolutions per minute (rpm). Excessive fiber balling was observed. The elliptical fibers did not disperse in this concrete.

EXAMPLE 2

In contrast to the prior art elliptical fibers of Example 1, fibers having a generally quadrilateral cross-section were used. These quadrilateral fibers had the following average dimensions: 50 mm long, 1.35 mm wide, and 0.2 mm thickness, with a Young's modulus of elasticity of 9 Giga Pascal. The bendability "B" of these fibers was computed in accordance with the formula, B=1/(3·E·I), wherein the moment of inertia "I" for rectangular cross-section was computed in accordance with the formula, $I_{rectangle}=\frac{1}{12} \cdot w \cdot t^3$, wherein "w" is the average width and "t" is the average thickness of the rectangle. Using the equation, the bendability "B" was computed as 41.2 mN$^{-1}$*m$^{-2}$. This fiber is considered flexible. When 100 pounds of these fibers were introduced into 8 cubic yards of concrete, located in a ready-mix truck drum and rotated at the same rate as in Example 1, a homogeneous fiber distribution was achieved in just 5 minutes. No fiber balling was observed.

EXAMPLE 3

The mechanical properties of the fibers themselves have a huge impact on the behavior of the fibers in concrete, if there is sufficient bond between the fiber and the brittle concrete matrix. If the fibers have not bonded well to the matrix (e.g. fiber pull-out is the major fiber failure mechanism observed when the fiber reinforced concrete is broken apart), then the fiber properties will have minimal impact on the behavior of the composite material. As mentioned earlier, due to the fiber geometry and dimensional ranges inventively selected by the present inventors, sufficient bond adhesion between the matrix material (when hardened) and the fibers can be achieved to obtain, ideally, half fiber failure (breakage) and half fiber pull-out. Therefore, fiber properties such as elastic modulus of elasticity, tensile strength, and minimum load carrying capacity were selected so as to maintain as closely as possible the ideal 50:50 balance between fiber pull-out failure and fiber failure. The optimum mechanical properties of the fibers will highly depend on the strength of the matrix: a higher strength matrix will require a fiber with a higher elastic modulus, higher tensile strength, and higher minimum load carrying capacity.

All the mechanical tests performed on the fiber itself have to be done in direct tension (i.e., longitudinal direction), which is also the mode the fibers fail when embedded in hardened concrete. (Commercially available machines for such testing are available from known sources such as Instron or Material Testing Systems). For these mechanical tests, a fiber filament, usually 100 mm long, is fixed on both ends with special fiber yarn grips that do not allow the fiber to slip. The fiber is slightly pre-stretched (less than 2 Newton of load is measured). A load cell measures the tensile load while the fiber is being pulled apart at a constant rate. Typical rates of loading range from 25 mm/min. to 60 mm/min. The strain is measured using an extensometer, which is clamped onto the sample. Strain is defined as the length change divided by the initial length (also called gauge length) multiplied by 100 and is recorded in terms of percentage. The initial gauge for the measurements was set to 50 mm.

Figure 13:
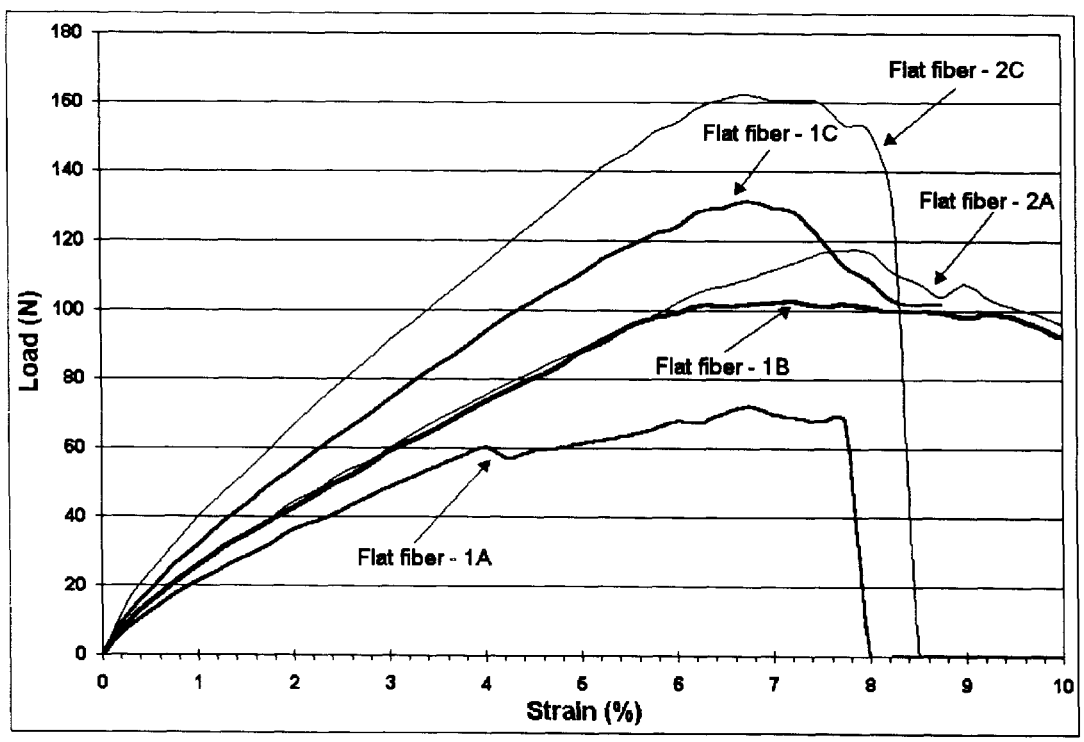
FIG. 13 is a graphic representation of tensile load versus strain behavior of different fibers.

FIG. 13 shows various load versus strain curves of fibers with different cross sectional areas. Fibers with number 1 are thinner than fibers with the number 2. The letters "A", "B", "C" are related to the width of the fibers: "A" is the fiber with the smallest width, while "C" is the fiber with the largest width. Therefore, the fiber with the smallest cross sectional area is fiber "1A", while the fiber with the largest cross section is fiber "2C".

These curves provided in this example show that a fiber with a small cross sectional area has a much lower minimum load carrying capacity than a fiber with a larger cross sectional area. Individual fiber bodies should have a minimum load carrying capacity such that a plurality of the fibers will cumulatively provide a total load-carrying capacity exceeding the tensile stress at which the concrete matrix material failed (i.e. the typical stress at failure for the concrete matrix is somewhere in the range of 2 to 5 Mega Pascals). The inventors believe that a minimum load carrying capacity (in tension) of the fiber is necessary in order to transfer stresses effectively as well as keeping the number of individual fibers down. By keeping the fiber numbers down, the workability of the fresh concrete can be maintained.

EXAMPLE 4

Figure 14:
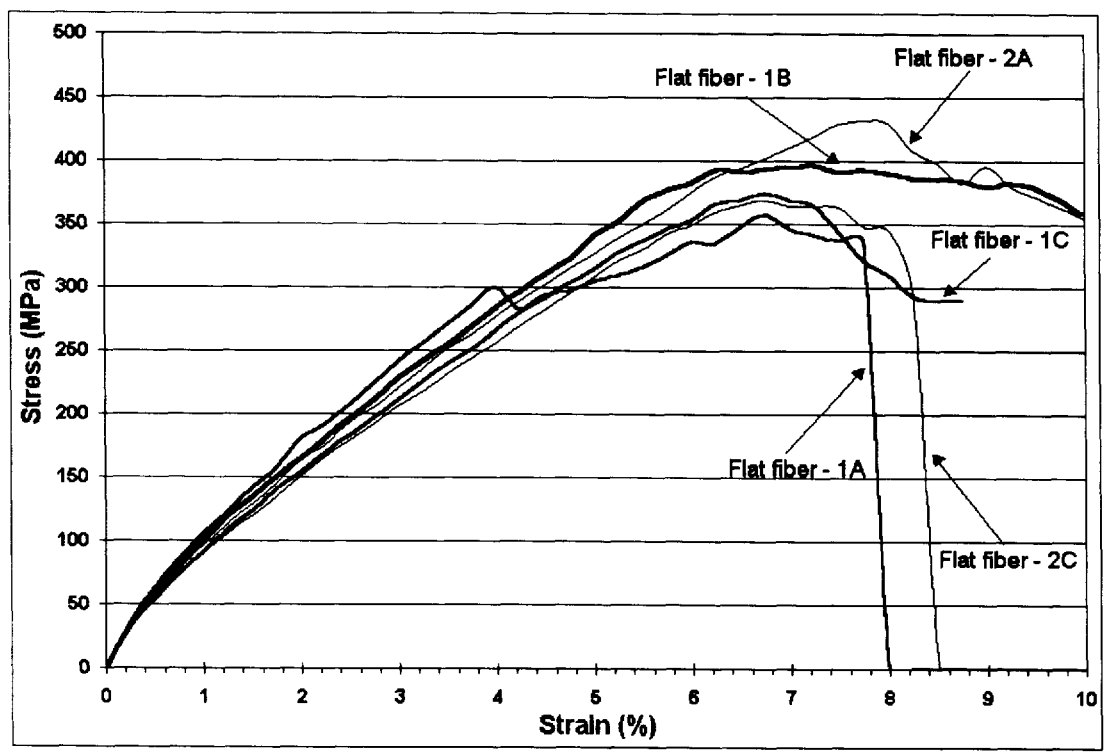
FIG. 14 is a graphic representation of tensile stress versus strain behavior of different fibers.

FIG. 14 shows the tensile stress versus strain curves of the fibers described in the previous example. "Stress" is defined as the load divided by the cross sectional area of the fiber. The slope of the initial part of the ascending curve is directly proportional to the modulus of elasticity of the fiber material. As mentioned earlier, the modulus of elasticity of the fiber should preferably be as close as possible to the modulus of elasticity of the matrix material, so as to transfer tensile loads across cracks in the matrix immediately after they have been initiated. On the other hand, a higher elastic modulus decreases bendability (ie. increases stiffness) of the fibers; the inventors discovered that this diminishes the dispersibility of fibers in wet concrete. To minimize the adverse effect of a high elastic modulus on the bendability of the fiber, the inventors selected a generally quadrilateral cross-sectional sectional profile and selected a thinner and wider fiber.

Figure 16:
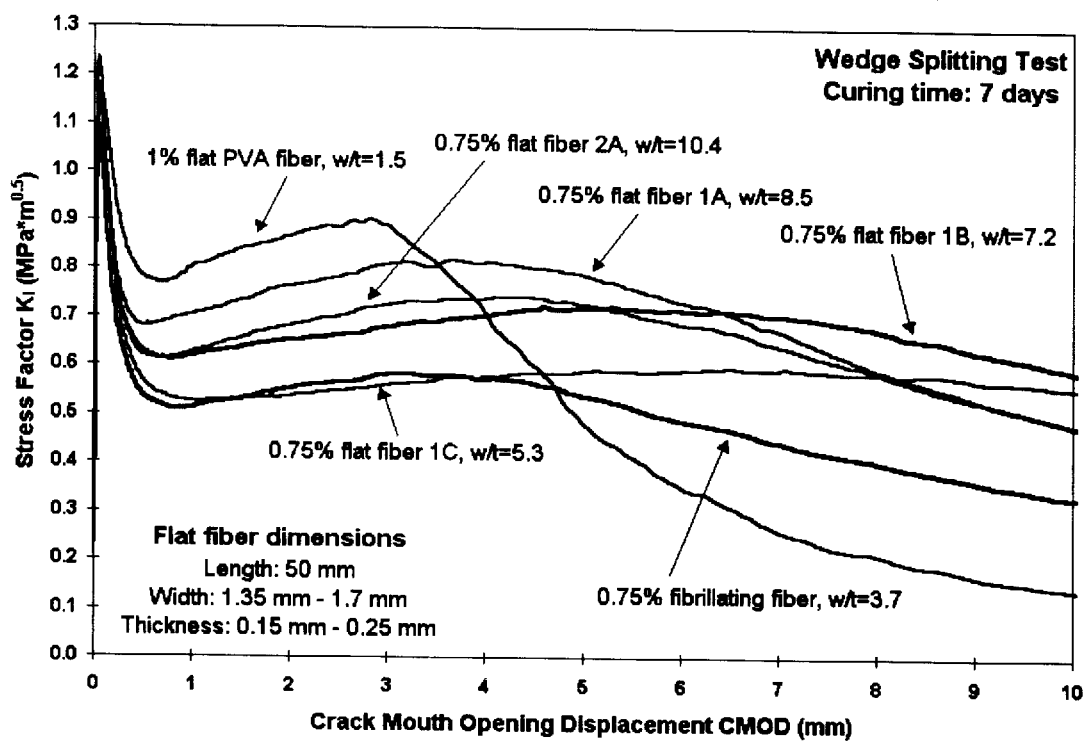
FIG. 16 is a graphic representation of stress vs. crack mouth opening displacement behavior of different fibers.

The stress-versus-strain curves shown in FIG. 14 indicate that the elastic moduli and tensile strengths of the different fiber samples are approximately the same (up to around 7% strain). However, as shown in FIG. 16, the use of different cross-sectional dimensions had a profound effect on the performance of the different fiber samples in the concrete.

EXAMPLE 5

The effect of different geometries of the fibers, as well as different minimum load carrying capacities on the mechanical properties of fiber reinforced concrete, can be studied using fracture tests. The basic principle of a fracture test performed on a given material is to subject a specimen (in this case the fiber reinforced concrete) to a load that initiates cracking in a controlled manner, while measuring the applied load and the deformation and eventual crack opening of the specimen. A suitable test for concrete is the Wedge Splitting Test, which is based on a modified Compact-Tension specimen geometry. The test set-up is described in the Austrian Patent AT 390,328 B (1986) as well as in the Austrian Patent AT 396,997 B (1996).

Figure 15:
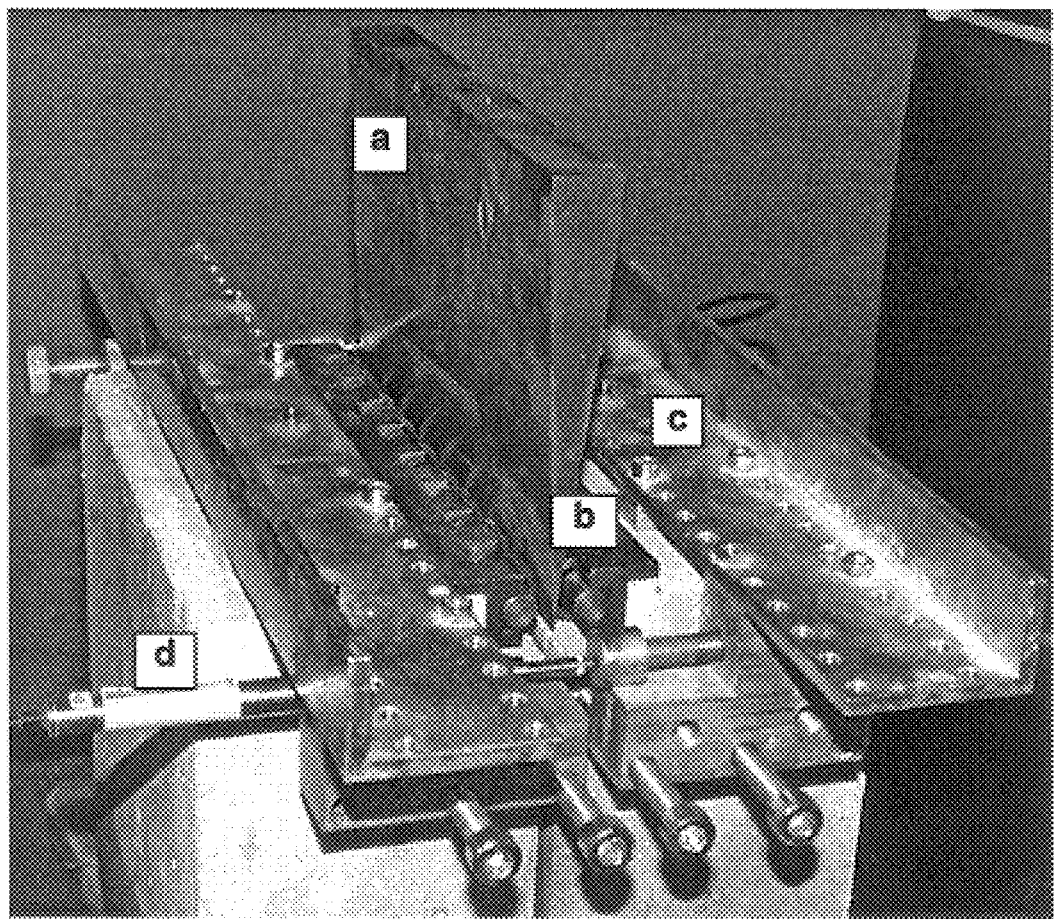
FIG. 15 is a photographic of a wedge-splitting device for testing load on cementitious matrix materials containing reinforcing polymer fibers.

FIG. 15 depicts a typical uniaxial wedge splitting test device that can be used for measuring load on concrete materials. A notched cube-shaped concrete specimen resting on a linear support (which is much like a dull knife blade is split) with load transmission equipment situated in a rectangular groove extending vertically down into the top of the sample concrete specimen. The load transmission equipment consists of a slim wedge (a) and two load transmission pieces (b) with integrated needle bearings. The crack mouth opening displacement (CMOD) is measured by two electronic displacement transducers (Linear Variable Differential Transducer or "LVDT" gauges) located on opposing sides of the crack. Both LVDTs (d) are mounted in a relatively simple way on a CMOD measurement device (c) that is attached to the specimen with screw bolts.

The crack initiates at the bottom of the starter notch and propagates in a stable manner from the starter notch on top of the concrete sample to the linear support below the sample. To obtain a load-versus-displacement curve, the two crack mouth opening displacement sensors, CMOD1 and CMOD2, and the applied load (downward through the wedge), are recorded simultaneously.

To maintain an approximately constant rate of crack opening, the test is performed with a rigid testing machine at a constant cross-head speed of 0.5 mm/min. to 1.0 mm/min. depending on the wedge angle. The applied machine load, $F_M$, the vertical displacement, $\delta_V$, and the crack mouth opening displacement, CMOD, are recorded simultaneously at least every second. The fracture energy, $G_F$, a measure of the energy required to widen a crack, is determined from a load-displacement curve by using the formula $$G_F = \frac{1}{B \cdot W} \cdot \int_0^{CMOD_{max}} F_H(CMOD) \cdot d(CMOD)$$

with $CMOD = \frac{1}{2}(CMOD1 + CMOD2)$ where "B" is the ligament height, "W" is the ligament width (B times W is the crack surface area), and "$F_H$" is the horizontal splitting load which may be calculated using the following equation, $$F_H = \frac{F_M + m_W \cdot 9.81}{2 \cdot \tan(\alpha/2)}$$

wherein "$F_M$" is the applied machine load, "$m_W$" is the mass of the splitting wedge, and "$\alpha$" is the wedge angle.

As a measure for the energy for crack initiation, the critical energy release rate "$G_{Ic}$" is calculated (plane stress assumed):

$$G_{Ic} = \frac{K_{Ic}^2}{E} \text{ with } K_{Ic} = k \cdot F_{H,max}$$

where "$K_{Ic}$" is the critical stress intensity factor, which is proportional to the maximum splitting load "$F_{H, max}$". The constant k depends on the specimen geometry and can be calculated by a finite element program.

The stress factor "$K_I$" is defined as following:

$$K_I = k \cdot F_H$$

where "$F_H$" is the horizontal load measured during the fracture of the specimen. The stress factor is independent of the specimen size, which can be used to compare the behavior of different specimens and materials.

The effect of the fiber on the mechanical properties of the composite material can be seen after a crack is initiated. FIG. 16 shows the stress-versus-crack opening behavior of different fiber geometries and fiber materials. The larger the area under the curve, the more energy the composite material can absorb while it is being broken apart. This phenomenon is also called 'toughening' of a material. The higher the 'toughness' of a material with a certain fiber dosage (volume %), the higher is the resistance to crack propagation of the material. If a certain fiber achieves similar toughness at a lower dosage, as compared to other fibers, then such a fiber will be considered to be a more effective reinforcing fiber.

FIG. 16 shows that flat, substantially non-fibrillatable fibers of the present invention are much more effective when compared to the performance of fibrillatable fibers of similar dimensions (when initially introduced into the concrete) and similar dosage. FIG. 16 also demonstrates that the performance of a flat PVA fiber (used at 25% higher dosage rate) with respect to resisting propagation at small crack openings is slightly better than that of other fibers. However, at larger crack openings, the exemplary flat fibers of the present invention clearly outperformed the flat PVA fiber in resisting higher deformations.

The present invention is not to be limited by the foregoing examples which are provided for illustrative purposes only.

It is claimed:

1. Fibers for reinforcing a concrete composition, comprising:
    a plurality of individual fiber bodies having an elongated length defined between two opposing ends and comprising at least one synthetic polymer, said individual fiber bodies having surfaces that are substantially free of stress fractures induced by mechanical-flattening of the fiber bodies between opposed rollers, said individual fiber bodies being substantially nonfibrillatable into smaller fiber units after mixing in wet concrete to the extent necessary to achieve substantially uniform dispersal of the fibers therein, and said fiber bodies having a generally quadrilateral cross-sectional profile along said elongated length, thereby having width, thickness, and length dimensions
    wherein the average width is no less than 1.0 mm;
    wherein the average width is no more than 5.0 mm;
    wherein the average thickness is no less than 0.1 mm;
    wherein the average thickness is no more than 0.3 mm;
    wherein the average length is no less than 20 mm;
    wherein the average length is no more than 100 mm;
    wherein the average fiber width to thickness ratio is no less than 5;
    wherein the average fiber width to thickness ratio is no more than 50;
    wherein said fiber bodies have a Young's modulus of elasticity no less than 3 Giga Pascals;
    wherein said fiber bodies have a Young's modulus of elasticity no more than 20 Giga Pascals;
    wherein said fiber bodies have a tensile strength no less than 350 Mega Pascals;
    wherein said fiber bodies have a tensile strength of no more than 1200 Mega Pascals;
    wherein said fiber bodies have a minimum load carrying capacity in tension mode no less than 40 Newtons per fiber body;

wherein said fiber bodies have a minimum load carrying capacity in tension mode no greater than 900 Newtons per fiber body;

wherein said fiber bodies have an average square area to volume ratio no less than 7.0 mm$^{-1}$;

wherein said fiber bodies have an average square area to volume ratio no more than 22.1 mm$^{-1}$;

wherein said fiber bodies have an average bendability "B" no less than 25 mN$^{-1}$*m$^{-2}$; and wherein said fiber bodies have an average bendability "B" no more than 500 mN$^{-1}$*m$^{-2}$;

said bendability "B" of said fibers being determined in accordance with the formula, B=1/(3·E·I), wherein the moment of inertia "I" for a generally quadrilateral is computed in accordance with the formula, I=1/12·w·t$^3$, wherein "w" is the average width and "t" is the average thickness of the generally quadrilateral cross-section.

2. The fibers of claim 1 wherein said average width is no less than 1.3 mm; said average width is no greater than 2.5 mm; said average thickness is no less than 0.15 mm; said average thickness is no greater than 0.25 mm; said average length is no less than 30 mm; and said average length is no greater than 60 mm.

3. The fibers of claim 1 wherein, in said plurality of individual fiber bodies, said individual fiber bodies are separated from each other.

4. The fibers of claim 1 wherein, in said plurality of individual fiber bodies, said individual fiber bodies are partially separated from each other but are completely separable when mechanically agitated within the matrix material.

5. The fibers of claim 1 wherein, in said plurality of individual fiber bodies, said at least one synthetic polymer is selected from the group consisting of polyethylene, polypropylene, polyoxymethylene, poly(vinylidine fluoride), poly(methyl pentene), poly(ethylenechlorotrifluoroethylene), poly(vinyl fluoride), poly(ethylene oxide), poly(ethylene terephthalate), poly(butylene terephthalate), polyamide, polybutene, and thermotropic liquid crystal polymers.

6. The fibers of claim 1 wherein said fiber bodies comprise polypropylene in an amount no less than 75% by weight and said fiber bodies comprise polypropylene in an amount up to 100%.

7. The fibers of claim 1 wherein said fiber bodies comprise a blend of at least two polymers or a co-polymer comprising at least two of said polymers.

8. The fibers of claim 1 wherein said fiber bodies comprise polypropylene and polyethylene.

9. The fibers of claim 1 wherein said fiber bodies have a Young's modulus of elasticity of no less than 5 Giga Pascals and wherein said fiber bodies have a Young's modulus of elasticity no more than 15 Giga Pascals.

10. The fibers of claim 1 wherein said fiber bodies have a tensile strength of no less than 400 Mega Pascals and wherein said fiber bodies have a tensile strength of no more than 900 Mega Pascals.

11. The fibers of claim 1 wherein said fiber bodies have a minimum load carrying capacity in tension mode of no less than 100 Newtons per fiber body and said fiber bodies have a minimum load carrying capacity in tension mode of no more than 300 Newtons per fiber body.

12. The fibers of claim 1 wherein said fiber bodies have a width to thickness ratio of no less than 5 and wherein said fiber bodies have a width to thickness ratio of no more than 50.

13. The fibers of claim 1 wherein said fiber bodies have an average surface square area "$S_A$" to volume "V" ratio of no less than 10 mm$^-$and wherein said fiber bodies have an average $S_A$ to V ratio of no more than 15 mm$^{-1}$.

14. The fibers of claim 1 further comprising a second plurality of individual fiber bodies, wherein said second plurality differs in terms of fiber composition, dimensions, a physical characteristic, or combination thereof.

15. The fibers of claim 1 wherein said individual fiber bodies have a variability of thickness or width along the individual fiber body length of no less than 2.5 percent deviation from average thickness or width as the case may be, and wherein said individual fiber bodies have a variability of thickness or width along the individual fiber body length of no greater than 25 percent deviation from the average thickness or width as the case may be.

16. The fibers of claim 1 wherein said individual fiber bodies comprise at least two synthetic polymers, one of said at least two synthetic polymers comprising an alkaline soluble polymer disposed on the outward fiber surface thereby being operative to dissolve when said fiber bodies are mixed into the alkaline environment of a wet concrete mix.

17. The fibers of claim 1 wherein said individual fiber bodies are coated with an alkaline soluble polymer operative to dissolve when said fiber bodies are mixed into the alkaline environment of a wet concrete mix.

18. Fibers for reinforcing a concrete composition, comprising:

a plurality of individual fiber bodies having an elongated length defined between two opposing ends and comprising at least one synthetic polymer, said individual fiber bodies having surfaces that are substantially free of stress fractures induced by mechanical-flattening of the fiber bodies between opposed rollers, said individual fiber bodies being substantially nonfibrillatable into smaller fiber units after mixing in wet concrete to the extent necessary to achieve substantially uniform dispersal of the fibers therein, and said fiber bodies having a generally quadrilateral cross-sectional profile along said elongated length, thereby having width, thickness, and length dimensions wherein the average width is no less than 1.0 mm;

wherein the average width is no more than 5.0 mm;

wherein the average thickness is no less than 0.1 mm;

wherein the average thickness is no more than 0.3 mm;

wherein the average length is no less than 20 mm;

wherein the average length is no more than 100 mm;

wherein the average fiber width to thickness ratio is no less than 5;

wherein the average fiber width to thickness ratio is no more than 50;

wherein said fiber bodies have a Young's modulus of elasticity no less than 3 Giga Pascals;

wherein said fiber bodies have a Young's modulus of elasticity no more than 20 Giga Pascals;

wherein said fiber bodies have a tensile strength no less than 350 Mega Pascals;

wherein said fiber bodies have a tensile strength of no more than 1200 Mega Pascals;

wherein said fiber bodies have a minimum load carrying capacity in tension mode no less than 40 Newtons per fiber body;

wherein said fiber bodies have a minimum load carrying capacity in tension mode no greater than 900 Newtons per fiber body;

wherein said fiber bodies have an average square area to volume ratio no less than 7.0 mm$^{-1}$;

wherein said fiber bodies have an average square area to volume ratio no more than 22.1 mm$^{-1}$;

wherein said fiber bodies have an average bendability "B" no less than 20 mN$^{-1}$*m$^{-2}$; and wherein said fiber bodies have an average bendability "B" no more than 1300 mN$^{-1}$*m$^{-2}$;

said bendability "B" of said fibers being determined in accordance with the formula, B=1/(3·E·I), wherein the moment of inertia "I" for a generally quadrilateral cross-section is computed in accordance with the formula, I=$\frac{1}{12}$·w·t$^3$, wherein "w" is the average width and "t" is the average thickness of the generally quadrilateral cross-section.

19. The fibers of claim 18 wherein, in said plurality of individual fiber bodies, said at least one synthetic polymer is selected from the group consisting of polyethylene, polypropylene, polyoxymethylene, poly(vinylidine fluoride), poly(methyl pentene), poly(ethylenechlorotrifluoroethylene), poly(vinyl fluoride), poly(ethylene oxide), poly(ethylene terephthalate), poly(butylene terephthalate), polyamide, polybutene, and thermotropic liquid crystal polymers.

20. The fibers of claim 18 wherein said fiber bodies comprise polypropylene in an amount no less than 75% by weight and said fiber bodies comprise polypropylene in an amount up to 100%.

* * * * *